United States Patent [19]
Park

[11] Patent Number: 5,933,678
[45] Date of Patent: Aug. 3, 1999

[54] DEVICE FOR DETECTING THE TONER IN THE DEVELOPING UNIT OF AN ELECTROPHOTOGRAPHIC APPARATUS

[75] Inventor: Gyeong-Ho Park, Suwon, Rep. of Korea

[73] Assignee: Samsung Electronics Co., Ltd., Kyungki-do, Rep. of Korea

[21] Appl. No.: 08/926,236

[22] Filed: Sep. 10, 1997

[30] Foreign Application Priority Data

Sep. 10, 1996 [KR] Rep. of Korea .................... 96-28812

[51] Int. Cl.⁶ .................................................. G03G 15/08
[52] U.S. Cl. ............................................ 399/27; 118/694
[58] Field of Search ........................ 399/24, 27; 118/694

[56] References Cited

U.S. PATENT DOCUMENTS

| | | | |
|---|---|---|---|
| 5,036,358 | 7/1991 | Yoshida | 118/694 X |
| 5,499,077 | 3/1996 | Endo et al. | 399/27 |
| 5,521,684 | 5/1996 | Takahashi | 118/694 X |
| 5,587,770 | 12/1996 | Jo et al. | 399/27 |
| 5,589,918 | 12/1996 | Oshida et al. | 399/114 |
| 5,621,221 | 4/1997 | Shinohara et al. | 250/576 |
| 5,649,264 | 7/1997 | Domon et al. | 399/27 X |
| 5,655,175 | 8/1997 | Oshida | 399/27 |

*Primary Examiner*—William Royer
*Attorney, Agent, or Firm*—Robert E. Bushnell, Esq.

[57] ABSTRACT

Disclosed is a versatile office machine, e.g. a laser printer, a facsimile machine, or an electronic copier, which includes a scanner for scanning a document, a developing unit for developing the scanned image of the document with a toner and a detector for detecting the toner in the developing unit. The device for detecting the toner can be constructed using a light emitting element mounted in the scanner to generate the light that is transmitted to the photoreceptor.

22 Claims, 3 Drawing Sheets

DEVICE FOR DETECTING THE TONER IN THE DEVELOPING UNIT OF AN ELECTROPHOTOGRAPHIC APPARATUS

CLAIM OF PRIORITY

This application makes reference to, incorporates the same herein, and claims all rights accruing thereto under 35 U.S.C. §121 through my patent application entitled *Device For Detecting The Toner In The Developing Unit Of An Electrophotographic Apparatus* earlier filed in the Korean Industrial Property Office on the 10$^{th}$ th day of Sept. 1996 and there duly assigned Ser. No. 28812/1996.

BACKGROUND OF THE INVENTION

1. Field of the Invention

The present invention concerns a device for an electrophotographic apparatus, and more particularly, a device for detecting the toner in the developing unit of an electrophotographic apparatus.

2. Description of the Related Art

Monitoring the level of toner in a developing unit is crucial for the proper operation of an electrophotographic apparatus during a printing process. An electrophotographic apparatus can be either one of a laser printer, an electronic copier, a facsimile machine, or any versatile office machine. The general operation of an electrophotographic apparatus starts with paper being loaded as from a supply tray and then transported through to a high pressure transfer unit. The high pressure transfer unit places the toner image onto the sheet of paper. Subsequently, the paper is transported to a fixing device that fixes the toner image onto the paper using both heat and pressure rollers.

To prepare the toner image for the high pressure transfer unit, it is necessary to attach toner particles to the latent electrostatic image on the photoconductive drum. The toner particles are applied by the developing unit, thereby transforming the latent electrostatic image into a latent toner image. Thus, the level of toner in the developing unit is critical to the proper operation of the electrophotographic apparatus. This importance has lead to many developments in toner detection methods. By way of example, U.S. Pat. No. 5,621,221 to Shinohara entitled *Toner End Detection Device And Method*, mentions a toner cartridge that has a light source and light sensor fixed near a bottom corner of the cartridge in order to detect when the toner is exhausted. U.S. Pat. No. 5,036,358 to Yoshida entitled *Image Forming Apparatus And A Method For A Detecting Developer Amount Therein* shows a toner cartridge with a light emitting device on the top of a toner cartridge and a second light receiving device on the bottom of the toner cartridge. U.S. Pat. No. 5,589,918 to Oshida entitled *Process Cartridge, Assembling Method Therefore And Electrophotographic Apparatus* and U.S. Pat. No. 5,521,684 to Takahashi entitled *Image Forming Apparatus Including Optical Element For Optically Detecting Amount of Developing Agent In Developer*, both disclose using light emitting and light receiving elements oriented linearly in a manner perpendicular relative to the base of the printer.

I have observed that what is needed, but so far unaddressed by the prior art, is a toner detection device that utilizes a light emitting element located on the side of a toner cartridge and a receiving element located in a recess in the bottom of the cartridge, that uses only one recess to accommodate the light transmission elements, than can be used with a diode light from the scanner being substituted for the separate light emitting element, and that measures the transmitted light by either the frequency or intensity of the light received by the photoreceptor. I expect that such a device would be more economical to manufacture thereby improving productivity and efficiency in the manufacturing process.

SUMMARY OF THE INVENTION

It is an object of the present invention to provide a device for detecting the toner in the developing unit that uses a constant relative position between the light emitting element and photoreceptor.

It is another object to provide a device for detecting the toner in the developing unit that includes a transparent window with a single channel-shaped groove so as to simplify the manufacturing process and thus improve the productivity.

It is still another object to provide a device for detecting the toner in the developing unit which uses a light emitting diode attached to the document scanner, thereby further decreasing the manufacturing costs.

To achieve these and other objects, the device for detecting the toner comprises a light emitting diode mounted on a scanner to generate a light beam, a photoreceptor for receiving the light beam, a transparent window for passing the light beam to the photoreceptor and a scraper for removing the toner from the surface of the window.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components wherein.

DETAILED DESCRIPTION OF THE PREFERRED EMBODIMENT

Figure 1:
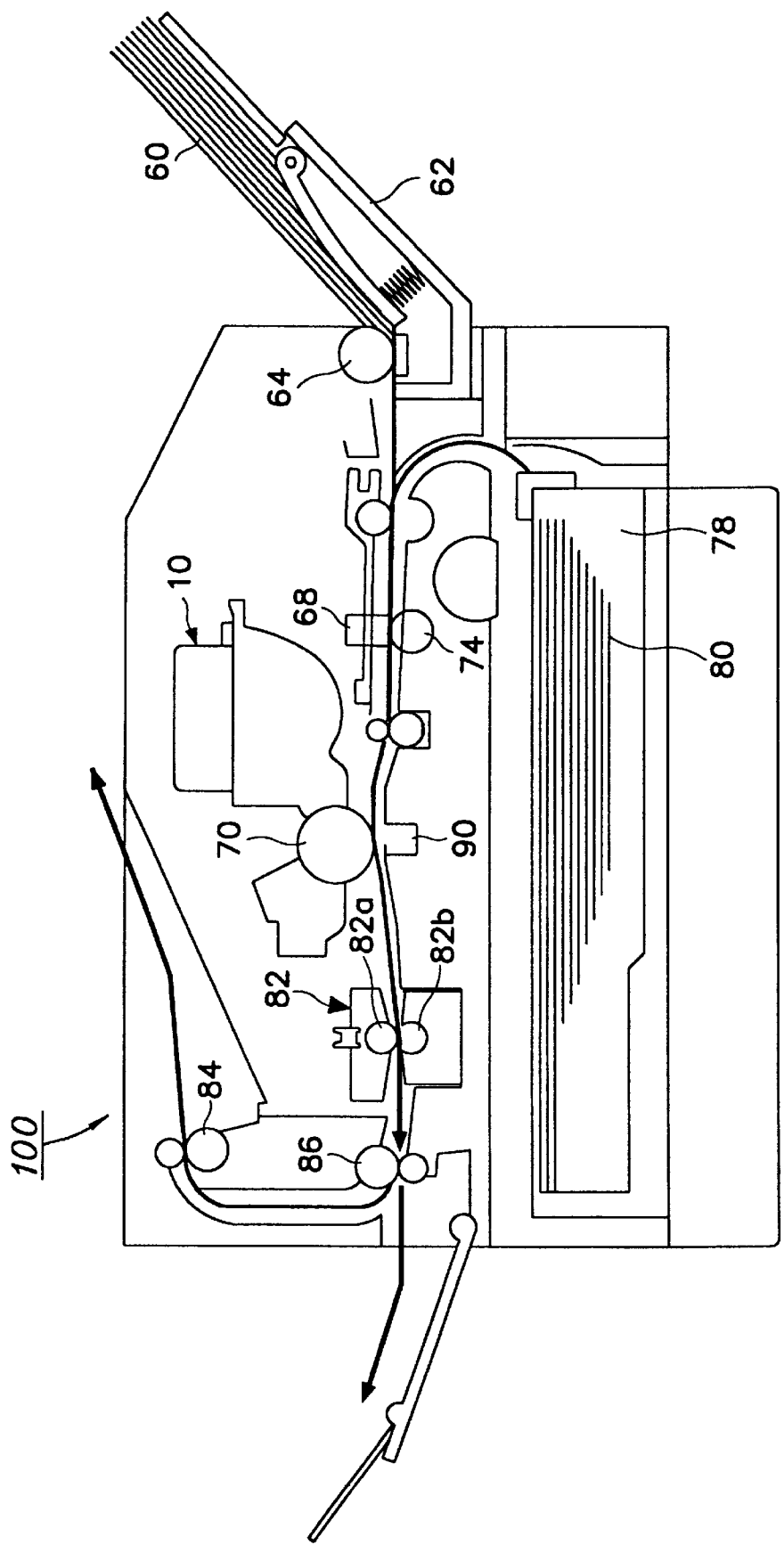
FIG. 1 is a schematic diagram of the general structure of a versatile office machine.

Turning now to the drawings, particularly FIG. 1, which illustrates the operation of a versatile office machine 100. A sheet of paper 60 is loaded from a document tray 62 and transported to a contact image sensor (CIS) 68, by an automatic document supplying roll 64. The CIS scans the document. Then, the CIS 68 generates a light beam to scan a sheet of paper 60. The light beam passes through the document reflected by a white roll 74. The reflected light beam is detected by an optical sensor producing corresponding image data. Subsequently, the paper 60 passes by the photoconductive drum 70 and is then fixed by a fixing unit 82. Then a pickup roll 86 and a discharging roll 84 eject the document.

During the beginning of the printing operation the surface of the photoconductive drum 70 is uniformly charged by a charging unit provided in the versatile office machine 100. Then, the surface of the photoconductive drum 70 is exposed to a light beam produced by an exposing unit, thus forming an electrostatic latent image. The electrostatic image is then transformed to a latent toner image by fine toner particles that are attached by a developing unit 10. The toner image formed on the photoconductive drum 70 is transferred to the paper by a high pressure transfer unit 90. The toner image is fixed on the paper 80 by the fixing unit's heating roll 82a and pressure roll 82b. Then, the sheet 80 is discharged by discharging roll 84 and ejected from the electrophotographic machine.

Figure 2:
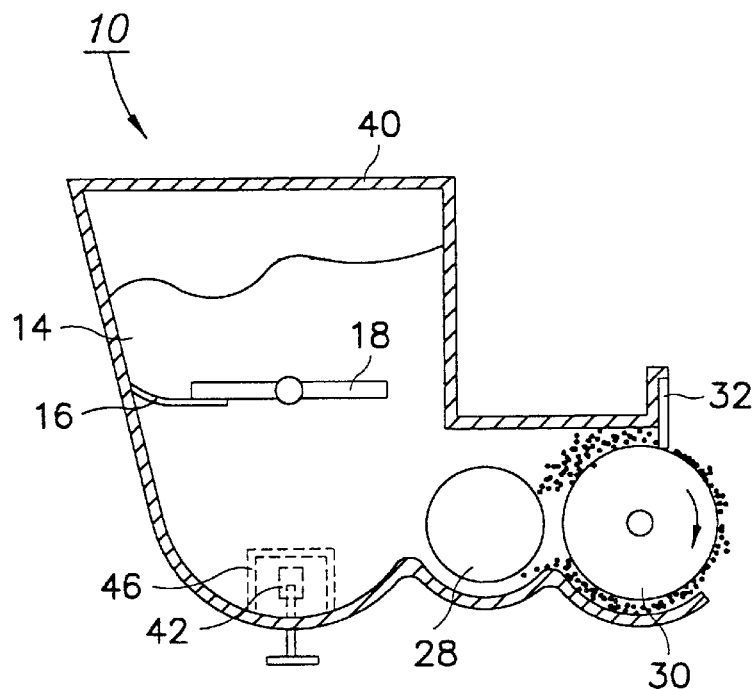
FIG. 2 is a schematic diagram of the structure of the developing unit of the versatile office machine.

There are two ways to detect the toner level in the developing unit of a versatile office machine. One way is to use a piezo-electric sensor and the second way is to use a shielded photosensor consisting of a light emitting element and a photoreceptor. As shown in FIG. 2, the frame 40 of the developing unit 10 includes an internal agitator 18 for stirring the toner 14. This prevents the toner from solidifying.

The developing unit 10 has a toner supplying roll 28 on one side of the agitator 18. The toner supplying roll 28 transports the agitated toner 14 to the developing roll 30. The developing roll then converts an electrostatic latent image on the photoconductive drum into a latent toner image. Mounted above the developing roll 30 is a doctor-blade 32 that spreads out the toner 14 that is laid on the surface of the developing roll 30 with a uniform thickness.

Figure 3:
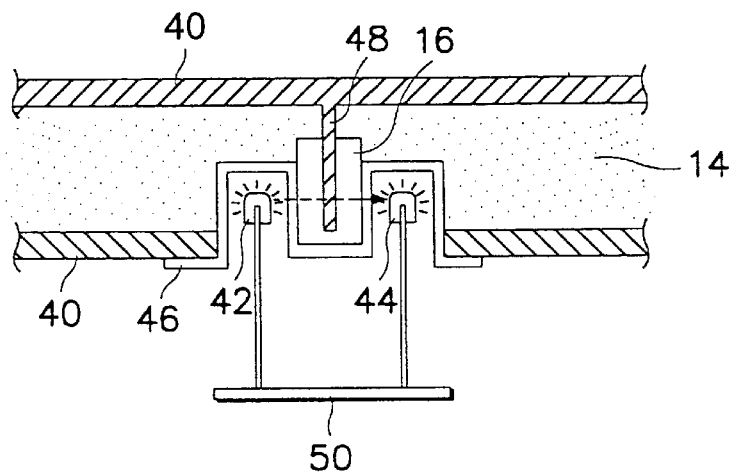
FIG. 3 is a schematic diagram of the structure of a device for detecting the toner in a developing unit.

A developing unit is shown in FIGS. 2 and 3. Arranged on the side of the bottom frame of the developing unit 10 is a light emitting element 42 and a photoreceptor 44, mounted on a printed circuit board 50. This toner in the unit is exhausted when light from the light emitting element 42 is received by photoreceptor 44. A transparent window 46 is located on one side of the bottom of the frame 40. The window contains two channel-shaped grooves for engaging the light emitting element 42 and the photoreceptor 44. The agitator 18 has a rib 48 that supports a scraper 16 that scrapes away the toner 14 that is deposited on the transparent window 46.

During the operation of the developing unit, toner 14 completely covers the transparent window 46 located on the side of the frame 40. When there is a sufficient amount of the toner 14 in the developing unit, the transparent window 46 remains covered and blocks the photoreceptor 44 from receiving light from the light emitting element.

As the toner 14 is depleted through repeated printing operations its level in the developing unit drops and eventually it no longer covers the transparent window 46. At this time, the transparent window 46 allows light from the light emitting element 42 to pass through to the photoreceptor 44. Then the user is notified that the electrophotographic apparatus requires the replacement of the developing unit 10 or the refilling of its toner.

The device for detecting the toner in the developing unit requires the printed circuit board 50 to be properly arranged to enable the light from the light emitting element 42 to reach the photoreceptor 44. Moreover, the printed circuit board 50 being mounted on the bottom of developing unit results in a spatial limitation. In addition, the transparent window 46 requires two channel-shaped shaped recesses for covering the light emitting element 42 and the photoreceptor 44. This increases the number of steps in the manufacturing process thereby decreasing productivity and increasing cost.

Figure 4:
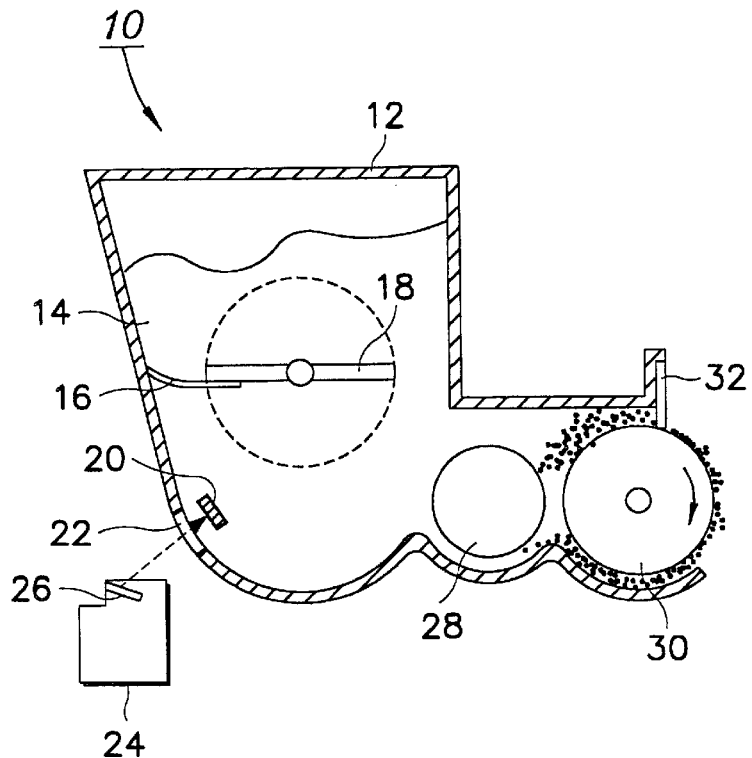
FIG. 4 is a schematic diagram of the structure of a new toner detection device that is mounted in a versatile office machine.
Figure 5:
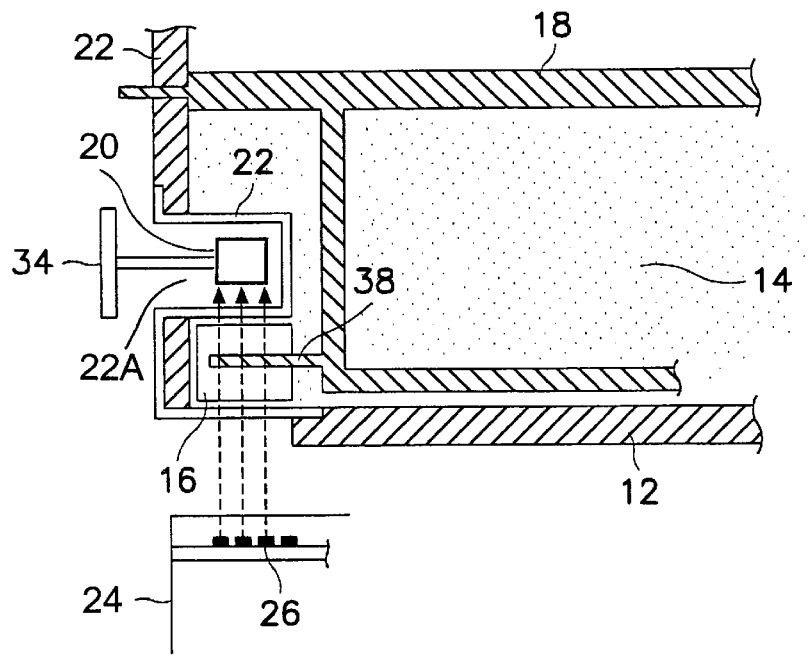
FIG. 5 is a cross-sectional view of the structure of the new toner detection device in a developing unit.

Referring now to FIGS. 4 and 5, the frame 12 of the developing unit 10 encloses an agitator 18 for stirring the toner 14 to prevent it from solidifying. The developing unit 10 is also provided with a toner supplying roll 28 on one side of the agitator 18. The toner supplying roll 28 supplies the agitated toner 14 to the developing roll 30. Mounted above the developing roll 30 is a doctor-blade 32 to spread out the toner 14 that is laid on the surface of the developing roll 30 with a uniform thickness.

A scanner 24 is located below the bottom of the frame 12. The scanner 24 includes a plurality of light emitting diodes 26 that emit light into the developing unit 10. Alternatively, the light from a contact image sensor may be used instead of a separate light emitting element.

Located on one side of the developing unit is a transparent window 22 with single recess 22A to pass the light of the light emitting diodes to a photoreceptor 20, which is mounted on a printed circuit board and placed in the recess. The agitator 18 has a rib 38 attached at one end that supports a scraper 16 that removes the toner 14 deposits on the transparent window 22.

During the printing process, the toner 14 in the developing unit 10 completely covers the transparent window 22 that is located on one side of the bottom of the developing unit's frame 12. When there is a sufficient amount of toner 14 in the developing unit, the transparent window 22 is covered by the toner and thereby prevents the photoreceptor 20 from receiving light from the light emitting diode 26. The scraper 16 removes the toner with the rotation of the agitator 18, so that toner deposits do not remain on the window after the toner is deposited.

As the toner 14 is depleted by repeated printing operations it eventually is unable to cover the transparent window 22 after the window is scraped by the scraper 16. Then, the transparent window 22 allows the light from the light emitting diode 26 to pass through to the photoreceptor 20. Thus, the user is alerted that the electrophotographic apparatus requires a replacement of the developing unit 10 or refilling of its toner. When not performing a scanning operation, one of the plural light emitting diodes 26 mounted in the scanner 24 may be turned on to detect the toner 14 in the developing unit 10.

As described above, this invention provides a device for detecting the toner level in the developing unit that keeps constant the relative position between the light emitting element and photoreceptor to enable light from the light emitting element to be oriented directly towards the photoreceptor. In addition, the inventive developing unit can employ light from a light emitting diode mounted on the scanner. Moreover, the single channel-shaped recess of the transparent window simplifies the manufacturing process and thus improves manufacturing productivity.

Although one preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A device for detecting the toner level in a developing unit used in an electrophotographic apparatus, comprising:

said developing unit having a body, said body having a first transparent window in a bottom of said body located near a distal end of said body, said first transparent window having a recess;

a second transparent window located in said distal end of said body;

a light receiving element attached to a printed circuit, said light receiving element inserted into said recess in said first transparent window; and a light transmitting element comprised of a diode from a document scanner attached to said electrophotographic apparatus and located near said second transparent window.

2. A device for detecting the toner level in a developing unit used in an electrophotographic apparatus according to claim 1, with said diode being part of a contact image sensor in said document scanner.

3. A device for detecting the toner level in a developing unit used in an electrophotographic apparatus according to claim 1, with said light receiving element being a photoreceptor.

4. A device for detecting the toner level in a developing unit used in an electrophotographic apparatus according to claim 1, where said light receiving element measures the frequency of transmitted light.

5. A device for detecting the toner level in a developing unit used in an electrophotographic apparatus according to claim 1, where said light receiving element measures the intensity of transmitted light.

6. A device for detecting the toner level in a developing unit used in an electrophotographic apparatus according to claim 1, with said light transmitting element being a light emitting diode.

7. A device for detecting the toner level in a container used with an electrophotographic apparatus, comprising:

said container having a body, said body having a bottom and a side that form a common edge; said body having a first section that partially transmits light, said first section being in said bottom of said body located near a common edge; said first section having a recess;

a second section that partially transmits light in said side of said body near said common edge;

a light receiving element inserted into said recess in said first section of said body; and a light transmitting element comprised of a diode from a document scanner attached to said electrophotographic apparatus and located near said second section.

8. A device for detecting the toner level in a container used with an electrophotographic apparatus according to claim 7, where said light receiving element is attached to a printed circuit board.

9. A device for detecting the toner level in a container used with an electrophotographic apparatus according to claim 7, with said diode being part of a contact image sensor inside said document scanner.

10. A device for detecting the toner level in a container used with an electrophotographic apparatus according to claim 7, with said light receiving element being a photoreceptor.

11. A device for detecting the toner level in a container used with an electrophotographic apparatus according to claim 7, where said light receiving element measures the frequency of transmitted light.

12. A device for detecting the toner level in a container used with an electrophotographic apparatus according to claim 7, where said light receiving element measures the intensity of transmitted light.

13. A device for detecting the toner level in a container used with an electrophotographic apparatus according to claim 7, with said light transmitting element being a light emitting diode.

14. A device for detecting the toner level in a container used with an electrophotographic apparatus according to claim 7, where said container is any one of either a developing unit or a toner cartridge.

15. A device for detecting the toner level in a developing unit used in an electrophotographic device, comprising:

said developing unit having a body; said body having a first section that partially transmits light, said body having a second section that partially transmits light, said first section having a recess;

a light transmitting element attached to said electrophotographic device located so as to emit light through one of either said first section or said second section of said body of said developing unit; and a light receiving element comprising a diode from a document scanner attached to said electrophotographic device and located near one of either said first section or said second section, said light transmitting element and said light receiving element not being on the same side of said developing unit.

16. A device for detecting the toner level in a developing unit used in an electrophotographic device according to claim 15, where said light transmitting element and said light receiving element are on adjacent sides of said body of said developing unit.

17. A device for detecting the toner level in a developing unit used in an electrophotographic device according to claim 15, where said light receiving element is attached to a printed circuit board.

18. A device for detecting the toner level in a developing unit used in an electrophotographic device according to claim 15, with said diode being part of a contact image sensor in said document scanner.

19. A device for detecting the toner level in a developing unit used in an electrophotographic device according to claim 15, with said light receiving element being a photoreceptor.

20. A device for detecting the toner level in a developing unit used in an electrophotographic device according to claim 15, where said light receiving element measures the frequency of transmitted light.

21. A device for detecting the toner level in a developing unit used in an electrophotographic device according to claim 15, where said light receiving element measures the intensity of transmitted light.

22. A device for detecting the toner level in a developing unit used in an electrophotographic device according to claim 15, with said light transmitting element being a light emitting diode.

* * * * *